United States Patent Office 2,715,591
Patented Aug. 16, 1955

2,715,591

SHEET MATERIAL

Boynton Graham, Claymont, Del., and John Augustus Piccard, Swarthmore, Pa., assignors to E. I. du Pont de Nemours & Company, Wilmington, Del., a corporation of Delaware No Drawing. Application December 16, 1952, Serial No. 326,359

10 Claims. (Cl. 117—138.8)

This invention relates to sheet material and, more particularly, to the preparation of sheet material employing fibers of synthetic linear polymers.

Many classes of sheet materials are by now well known in the art, for instance, films, textile fabrics, coated fabrics, non-woven fabrics, and the like. These materials differ quite markedly in properties and exhibit various advantages and disadvantages. For instance, woven textile fabrics prepared from natural or synthetic fibers, or both, generally exhibit a desirably high tensile strength but frequently an inadequate tear strength and are nonuniform in extensibility in all directions, which is particularly undesirable in certain uses. On the other hand, the homogeneous film-type sheet materials, while being desirably nonporous and impervious for certain uses and usually possessing uniform extensibility in all directions, generally suffer from undesirably low tensile and tear strengths, particularly as compared to woven fabrics of equal weight.

In attempts to combine the desirable properties of these two classes of materials, much work has been done with the application of surface coatings of the film-forming materials to woven textile materials as well as the preparation of laminates of woven and non-woven fabrics and homogeneous film materials. Simple mixing of film-forming materials with textile fibers used in forming the woven and non-woven fabrics, with subsequent sheet formation of the mixture has also been tried. However, none of these various compositions exhibits to any marked extent the combination of the desirable extensibility of the film materials with the high tensile and tear strengths of the woven fabrics.

An object of the present invention is to provide a new type of sheet material having a desirable combination of extensibility with high tensile and tear strengths. A further object is to provide such a sheet material employing fibers of synthetic linear polymers. A still further object is to provide a permeable sheet material having superior properties, more particularly, properties adapting the material for use in place of natural leather in certain protective clothing outlets, especially in shoe uppers. Other objects will be apparent from the description of the invention given hereinafter.

The above objects are accomplished according to the present invention by forming sheet material essentially comprising, by weight, 20% to 80% of matted, that is, non-woven, undrawn, but orientable fibers of a synthetic linear polymer and 80% to 15% of an extensible polymeric binder. In a more specific form, sheet material of the present invention comprises 30% to 70% of matted, undrawn but cold-drawable fibers of a synthetic linear polymer, the fibers being not greater than 1.5 inches in length and, preferably, not greater than 0.5 inch in length, and 70% to 30% of an extensible polymeric binder.

It has been found that sheet material as characterized above surprisingly exhibits high and permanent elongation or extensibility with essentially no retractive tendencies. This sheet material is outstanding in its ability to be permanently formed into any desired shape with no problems of retraction, i. e., it holds the desired formed shape. It also exhibits outstanding impact toughness. These properties are extremely important for use of this sheet material in many articles as, for example, shoe toe caps, wrapping materials, and the like.

The sheet material of this invention can be prepared by bringing into intimate contact the undrawn, i. e., unoriented, but orientable synthetic linear polymer fibers in the form of an unwoven mat, web, or felt, with the extensible polymeric binder by any suitable means such as impregnation of the mat with a solution or dispersion of the binder, or by simple mixing in those instances wherein a fibrous or particulate form of the polymeric binder is used, and subsequently consolidating to any degree the resulting product, either by thermal or solvent means, preferably under pressure. Alternatively, the sheet material, if it is to be non-permeable, can be formed by uniting an unwoven mat of the fibers with the polymeric binder in the form of a continuous sheet, the consolidation being carried out as before either by solvent or thermal means and, preferably, under pressure.

The unwoven mats of fibers used in the preparation of the sheet material of this invention can be made by suitable known methods. Where fibers greater than 1.5 inches in length are used, it is generally necessary to use the wool-carding technique to form the mats. This method is relatively uneconomical and usually results in carded mats in which the fibers are ordered with respect to each other in the direction of the carding, with the result that the sheet material prepared from such mats are not dimensionally homogeneous and, hence, exhibit appreciable differences in properties as a function of direction. It is preferred, however, to use fibers not greater than 1.5 inches in length because such fiber lengths give sheet material of outstanding strength characteristics as well as excellent pliability and flex life and, at the same time, such fibers can be formed into non-woven mats by air-blowing and paper-making techniques which are more economical than wool-carding and produce mats which are dimensionally homogeneous. It is preferred to use fibers not greater than 0.5 inch in length inasmuch as these are highly adapted for use in the most economical paper-making procedures.

The fact that the sheet material of this invention which employs undrawn but orientable fibers, possesses such outstanding properties, particularly its high strength, is both surprising and really contraindicated by the art. The prior art uniformly teaches that synthetic fiber-based materials are appreciably stronger when the synthetic fibers are in oriented form. The unexpectedness of the properties of the instant sheet material is particularly marked with respect to the sheet material using fibers not greater than 1.5 inches in length because it had been found that when using oriented synthetic polymer fibers in making non-woven mats, it was necessary to use fiber lengths of at least 1.5 inches to produce products of optimum strength. Due to the length of fiber, the non-woven mats in such instances were necessarily made by the relatively uneconomical wool-carding technique.

The sheet material of this invention can be prepared so as to exhibit uniform extensibility in all directions, or not, depending on the degree of order of the structural fibers therein. Thus, a material prepared from a fibrous mat in which the fibers are so combined as to be random in their distribution, will exhibit essentially uniform extensibility in all directions. On the other hand, if the mat is so prepared that the fibers bear an ordered relationship to each other, then the end product will exhibit non-uniform extensibility with the maximum extensibility occurring in the direction in which the fibers are least ordered.

The sheet material of this invention can be prepared so as to be permeable or non-permeable, depending on the degree of consolidation effected in the forming step. Where complete consolidation of the sheet material is effected as, for example, either by solvent or thermal means, the latter usually with pressure, a non-permeable sheet will result. Where incomplete consolidation is effected as, for example, by thermal means with or without pressure, conveniently obtained through the use of spacers or shims, the sheet material will be permeable. Permeable sheet material can also be obtained by incorporating pore-forming fibers along with the structural fibers in the mat and then, after consolidation, extracting the pore-forming fibers by means of a preferential solvent therefor which is a non-solvent for the structural fibers and binder.

The permeable sheet material constitutes a preferred embodiment of this invention since it is of particular utility in the important leather replacement field where its outstandingly high tensile and tear strengths make it of particular significance. Because of the improved leather-like properties, particularly in the ability to breathe, with high tensile strength and especially high tear strength, the permeable, leather-like products of this invention containing a volume percent of interconnecting void space uniformly distributed therethrough at least equal to 3000 (weight percent fiber)$^{-1}$—30 and not greater than 70%, is preferred. Such products are of outstanding utility in the leather replacement field. A particularly preferred group of the leather-like products of this invention adapted for use in the leather garment field, as exemplified by shoe uppers, are those permeable products containing a volume percent of interconnecting void space uniformly distributed therethrough equal to 3000 (weight percent fiber)$^{-1}$—(25±5). Such products designed for use in the leather replacement field range in weight from 5 to 20 oz./sq. yd. and preferably, from 8 to 12 oz./sq. yd. By contrast, sheet material of this invention for fabric replacement will generally range in weight from 0.5 to 5.0 oz./sq. yd.

Because of the greater toughness and wear resistance conferred on the sheet material, whether permeable or non-permeable, it is preferred to use as the extensible polymeric binder a polymer which is chemically dissimilar to and incompatible with the synthetic linear polymer used for the structural fibers. A chemically dissimilar and incompatible polymeric binder is characterized in that it is incompatible in a melt with the polymer used for the structural fibers. The use of chemically similar polymeric binders results in products which are comparatively deficient in toughness and pliability. Also, the polymeric binder should melt; i. e., flow, below the softening or deformation temperature of the structural fibers in the sheet material where the consolidation is being effected by heat, in order that the structural fibers may not be harmed.

The term "orientable" in describing the structural fibers used herein refers to that phenomenon exhibited by synthetic linear, high molecular weight polymers wherein under tension the unordered molecular segments tend to adopt an ordered parallel arrangement. Usually, this is accompanied by appreciable flow of polymer molecules and resultant elongation. For each polymer there is a critical level of tension and resultant elongation beyond which no further orientation or elongation occurs and once this point is reached the effects are permanent and the polymer is "oriented."

In the sheet material of the present invention the structural fibers should be orientable under conditions of use of the sheet material. That is, polymers orientable at only relatively high temperatures at which the sheet material would tend to lose some of its two-component (structural fiber/binder) character through thermal decomposition or melting, are not suitable. Preferably, undrawn structural fibers which are cold-drawable (i. e., orientable at room temperature) are used.

The following examples in which proportions are given by weight unless otherwise stated, illustrate specific embodiments of the invention.

In the examples, Schiltknecht flex life values refer to the number of flexes a sample of the leather-like sheet undergoes before surface cracking in the Schiltknecht flex machine, which is described in detail in Bulletin #105 of Alfred Sutter Co., 200 Fifth Avenue, New York, N. Y. Tongue-tear strength is reported in pounds and is a measure of the force necessary to continue an existing tear in the material being tested. The values given are average values obtained in the manner of ASTM procedure D–39–39, using the Model TTB tester, manufactured by the Instron Engineering Corporation. Tensile strength is reported in units of lb./sq. in. and represents the maximum load undergone by the sample under test when subjected to linear stress in the plane of the sample strip in the same type tester. Elongation values are reported as percentage of the original length and are obtained during the same test and represent the maximum elongation incurred in the strip sample being tested. Modulus values which are also obtained with the same type tester in accordance with ASTM test procedure D–638–46T are expressed in units of lb./sq. in and actually represent the modulus of elasticity in tension, e. g., the stiffness. A higher modulus indicates a stiffer membrane.

Example I

A dispersion of 4.1 parts of half-inch long undrawn polyhexamethyleneadipamide staple fiber with a 9.1 denier per filament in 16,000 parts of water containing about 0.5 part of a commercial alkylaryl polyether dispersing agent was formed into a mat according to paper-making techniques by deposition on a wire screen of dimensions such as to give a fiber weight of about 6 oz./sq. yd. The resultant mat, after drying, was plied with another such mat and the plied mats were impregnated with a solution of 8.2 parts of a 100/60 polyvinyl chloride-dioctyl phthalate blend in a 104.3/2.5 tetrahydrofuran/dimethylformamide solvent mixture to give a fiber/binder ratio of 49/51. The freshly impregnated plied mat was coagulated by submerging in water, then dried, pressed 10 minutes at 160° C. and 156 lb./sq. in. pressure using shims to prevent complete consolidation. After splitting there was thus obtained a 48 mil thick, tough, permeable leather-like film with a "flesh" side and a "grain" side and a 51% void space, which exhibited a tensile strength of 1501 lb./sq. in, an elongation of 143%, a modulus of 7750 lb./sq. in., a tongue-tear of 1.27 lb./oz./sq. yd., and a Schiltknecht flex life of 11,000,000. In contrast, a similar, permeable, leather-like film prepared in the same way using drawn polyhexamethyleneadipamide staple fiber of 3 denier/filament exhibited a tensile strength of 1827 lb./sq. in., an elongation of only 19%, a modulus of 15,855 lb./sq. in., a tongue-tear of only 0.74 lb./oz./sq. yd., and a Schiltknecht flex life of only about 1,000,000.

Example II

Undrawn polyhexamethyleneadipamide yarn was cut to fiber lengths of 2.0–2.5 inches, the cut fibers then opened and baled under a pressure of 3000 lb./sq. in. The resultant bale was broken and rebaled, broken again and finally rebaled. Using conventional wool-carding techniques, non-woven mats of the undrawn 2.0–2.5 inch fibers were then prepared and laminated with polyethylene films to give a laminate containing equal parts of the undrawn polyhexamethyleneadipamide fibers and polyethylene. The resultant laminate was preheated to 140° C. and then pressed at this temperature under a pressure of 1000 lb./sq. in. for four minutes. The resultant non-permeable, non-woven laminated sheet material was 18.9 mils thick, weighed 11.59 oz./sq. yd. and exhibited an elongation of 225% and a tear strength of 5.8 lb./oz./sq. yd. as determined in accordance with ASTM test procedure D39–49. Under like conditions, a laminated product 14 mils thick prepared similarly but having 70% of the undrawn polyhexamethyleneadipamide fibers and 30% of polyethylene, weighed 9.24 oz./sq. yd. and exhibited an elongation of 193% and a tear strength of 7.3 lb./oz./sq. yd. In contrast, a similar laminate prepared so as to have 53% of drawn polyhexamethyleneadipamide fibers of comparable lengths and 47% of the polymer from ethylene exhibited an elongation of only 73%.

*Example III*

Non-woven fibrous mats were prepared from the undrawn 2.0–2.5 inch long polyhexamethyleneadipamide fibers described in Example II and the mats were then partially impregnated with a 7% solution of polyisobutylene in a mixture of toluene and benzene in amount sufficient to give, on a dry basis, 57% polyhexamethylenadipamide fibers and 47% polyisobutylene. After allowing the partially impregnated mats to dry, two mats were then plied, preheated to 140° C., and then pressed at this temperature under a pressure of 1000 lb./sq. in. for four minutes. The non-permeable sheet material thus obtained was 18.5 mils thick, weighed 12.34 oz./sq. yd., and exhibited an elongation of 256%. In contrast, a sheet material similarly prepared from drawn polyhexamethyleneadipamide fibers of comparable lengths and polyisobutylene so as to have 60% of the fiber component and 40% of the polyisobutylene exhibited an elongation of only 75%.

It will be understood that the above examples are merely illustrative and that the present invention broadly comprises sheet material essentially consisting of, by weight, 20% to 85% of matted, undrawn but orientable fibers of a synthetic linear polymer and 80% to 15% of an extensible polymeric binder.

The structural fibers used in the instant sheet materials must be undrawn but orientable fibers of synthetic linear polymers. Practically, they must be orientable under the conditions of use of the sheet material and, hence, generally will be cold-drawable. For ease in fabrication of the sheet material, the binder component should melt, i. e., flow at a temperature appreciably below that at which the structural fibers melt or deform, for example, at least 10° C. below and, preferably, 100° C. or more below the softening temperature of the structural fibers.

Undrawn but orientable fibers adapted for use in this invention include those of both the addition and condensation type polymers. Fibers of certain of the synthetic, high molecular weight vinylidene type addition polymers are suitable. Specific examples of such polymers include those of ethylene, polymers and copolymers of the alpha-methylenecarboxylic acids, and derivatives and precursors thereof, including copolymers with other addition polymerizable monomers, e. g., acrylonitrile polymers and copolymers.

Preferred as the structural fiber component in the present invention are the undrawn but orientable fibers of the synthetic linear condensation polymers, e. g., the polyamides, polyesters, polyesteramides, or mixtures or blends thereof, such as the diabasic acid/diamine or amino acid polyamides, the dibasic acid/diol or hydroxy acid/polyesters, or the intermixed polyester/polyamide products by now well known in the art and described in greater detail in U. S. Patents 2,071,250, -251, -253, 2,130,948, 2,224,037, and the like. A particularly suitable class of such synthetic linear condensation polymers, because of good cold-drawability and the readier availability of intermediates necessary thereto, include the synthetic linear condensation polyamides prepared from the dibasic carboxylic acids or amide-forming derivatives thereof, and amino compounds having two amino hydrogen-bearing amine groups separated by divalent organic radicals, free of active hydrogen and preferably solely hydrocarbon in nature. Specific examples of such linear condensation polymers include polytetramethylene-sebacamide, polyethyleneterephthalamide, polydodecamethyleneadipamide, and the like. Also included in this species of the linear condensation polyamides are those prepared from the amino hydrogen-bearing amino substituted carboxylic acids or amide forming derivatives thereof, preferably those wherein the hydrogen-bearing amine group is on the omega-carbon of the carboxylic acid chain, e. g., the alpha-aminocarboxylic acids, the epsilon-aminocarboxylic acids and the like. Specific examples of such polyamides include poly-D- or L- or DL-alanine, poly-D-, L-, or DL-leucine, poly-epsilon-aminocaproic acid, and the like.

Another similarly suitable class of synthetic linear, orientable, condensation polymers are the polyesters, i. e., those polymers containing a plurality of recurring intrachain ester or acyloxy linkages, particularly those containing a plurality of recurring intrachain carboxy ester linkages. Specific examples of such polymers which can be prepared, for instance, by the intermolecular condensation between essentially molar proportions of dibasic acids and dihydroxy-hydrogen-bearing polyols, particularly those which apart from the carboxyl and hydroxyl groups are solely hydrocarbons, include polydodecamethylene adipate, polyethylene sebacate, polyhexamethylene oxalate, and the like.

Also included in this species of the linear condensation polyamides are those prepared from the hydroxyl hydrogen-bearing alcohol substituted carboxylic acids, preferably those wherein the hydrogen-bearing hydroxyl group is on the omega carbon of the carboxylic acid chain, e. g., the alpha-hydroxycarboxylic acids, the epsilon hydroxy carboxylic acids and the like. Specific examples of such polyamides include poly-D-, or L-, or DL-lactic acid, poly-D-, or L-, or DL-mandelic acid, poly-epsilon-hydroxycaproic acid.

It is within the scope of this invention to use as the fiber component blends of the foregoing orientable condensation polymers such as blends of the polyesters with the polyamides, polyesters with the polyesteramides, polyamides with the polyesteramides, and the like.

Because of their generally stronger fiber properties and the resultant higher strength mats prepared therefrom, it is preferred to use in the products of this invention the above described synthetic linear condensation polymer fibers, particularly of the polyamides and especially polyhexamethyleneadipamide and epsilon-aminocaproic acid homopolyamides, in undrawn but orientable form as the fiber component. Generally, polymers softening above 100° C. and, preferably above 200° C., will be used.

The structural fibers can vary from 10 mils, i. e., 0.01 inch, to as much as 8 inches or more in length. All variations of the sheet material of this invention, regardless of the length of the structural fiber, show improved extensibility or elongation, pliability, and impact toughness. However, the preferred sheet material which exhibits outstanding toughness is that prepared from fibers not greater than 1.5 inches long and, most preferably, not greater than 0.5 inch long. Further, this preferred sheet material is more economical to make since these short fibers can be handled by paper-making and air-blowing techniques.

The denier of the structural fiber can be as great as 60 denier/filament, but for ease of handling and the greater pliability, toughness, and scuff resistance of the products prepared therefrom it is preferred to use fibers of from three to nine denier/filament.

The extensible polymeric binder used must be chemically dissimilar to the linear condensation polymer used in the fiber component and incompatible therewith for most outstanding properties in the sheet material of this invention. This means that the strongest, toughest, and, therefore, preferred sheet material is prepared in those instances wherein one of the addition polymers is used as the polymeric binder with structural fibers of a linear condensation polymer and vice versa. The polymeric binder should be strong and pliable and, accordingly, no matter which type of polymer is used the preferred binder polymers are those of higher pliability.

This frequently means polymers of polycomponent structure, e. g., copolymers, often preferably plasticized. Because of greater ease in handling, tensile strength, and wear resistance arising from their use, it is preferred to use as the polymeric binder those synthetic polymers which are chemically dissimilar to and incompatible with the fiber polymer; which melt, i. e., flow, at least 10° C. and, preferably, at least 100° C., below the softening, i. e., deformation, temperature of the synthetic linear polymer used in the structural fibers; and which in film form exhibit tensile strengths of at least 500, and, preferably, at least 1000, lb./sq. in., elongations of at least 100%, and, preferably, at least 200%, and moduli no greater than 25,000, and, preferably, no more than 5,000, lb./sq. in., with the product of said tensile strength and elongation being at least 100,000.

Because of greater strength, flex life, and ease of handling, the polymeric binder will be a synthetic linear addition polymer of the above given set of properties and the structural fibers will be made from a synthetic linear condensation polymer in undrawn but orientable form. Frequently, when higher pliabilities are desired in the resulting sheet material, the polymeric binder will contain one or more modifiers, in particular, plasticizers for the polymer being used in the binder. Other modifying agents equally well known in the art can also be present in the binder, such as dyes, pigments, fillers, and the like.

The chemically dissimilar polymers useful in the polymeric binder include synthetic addition polymers, synthetic condensation polymers which are not chemically similar to the fiber component, and natural and modified natural products, e. g., cellulose acetate, cyanoethyl cellulose, and the like. Because of their readier availability, better properties, and appreciably greater ease of handling, the preferred class of binder polymers are the addition polymers. Particularly outstanding are the addition polymers containing in combined form the ethylenically unsaturated monomers including both the mono- and diene-type monomers. Suitable examples of such polymers include polyethylene and the lower monoene and diene solely hydrocarbon polymers such as polypropylene, polyisobutylene, polybutene-2, polyisoprene, including both synthetic and natural, and the like; the negatively substituted monoene and diene polymers such as those from vinyl chloride, 2,3-dichlorbutadiene, vinyl acetate, and the like; as well as copolymers from such monomers including both the hydrocarbon and negatively substituted monoene and diene monomers such as butadiene/styrene, tetrafluoroethylene/ethylene, tetrafluoroethylene/chlorotrifluoroethylene, vinyl chloride/vinyl acetate, copolymers and the like.

Again, because of their readier availability and, in particular, because of their lower cost and more desirable polymer properties, the most preferred of these addition polymers for use in the polymeric binders are the vinylidene polymers and copolymers, including both the monoene and diene types. This class of polymers is characterized by having in each polymerizable monomer therein involved as the only polymerizable ethylenic unsaturation, terminal ethylenic groups wherein the terminal carbon is a methylene carbon, i. e., those containing one or more vinylidene ($CH_2=C<$) groups. Included in this most preferred class are the great majority of commercially available addition polymers. Specific examples of such polymers include the various vinylidene hydrocarbon polymers and copolymers such as polyethylene, polyisobutylene, polybutadiene, polyisoprene; the various negatively substituted polymers and copolymers such as the vinylidene halide copolymers, e. g., vinylidene chloride, the various vinyl halide polymers such as the vinyl chloride and vinyl fluoride polymers and copolymers as well as their derivatives such as the halogenated vinyl and vinylidene polymers, e. g., chlorinated polyethylene, chlorinated polyvinyl chloride and the like; the various vinylidene polymers wherein one or both of the indicated free valences of the 2-carbon of the vinylidene group are bonded directly to carboxyl groups or groups hydrolyzable to carboxyl groups either directly to the acyl carbon or the oxy oxygen thereof, such as polymers of the various vinylidene esters, including vinyl acetate, ethylidene diacetate, vinyl propionate, vinyl butyrate and the like; the vinylidene carboxylic acids and their derivatives such as acrylic acid, methacrylic acid, methyl methacrylate, acrylonitrile, methacrylamide, and the like.

Also included in this most preferred group of polymers are the various copolymers of such vinylidene monomers, including specifically the various monoene/diene copolymers of this class such as the butadiene-1,3/acrylonitrile, 2,3-dichlorobutadiene-1,3/2-chlorobutadiene-1,3 copolymers and the like; the various monoene/vinylidene copolymers such as the extremely important commercially vinyl chloride and vinylidene chloride copolymers, e. g., vinyl chloride/vinyl acetate, vinyl chloride/vinylidene chloride, vinylidene chloride/vinyl acetate, vinyl chloride/vinyl acetate/acrylonitrile copolymers; the various vinylidene hydrocarbon negatively substituted vinylidene copolymers, e. g., ethylene/vinyl acetate and the hydrolyzed products therefrom; ethylene/vinyl chloride; butadiene/methyl methacrylate, butadiene/acrylonitrile, isoprene/acrylonitrile copolymers, and the like.

In the case of those polymeric binders containing in combined form appreciable proportions of diene monomers, particularly the vinylidene diene monomers, it is frequently desirable to have present in the solution, dispersion, or bulk treating material, whichever is used, suitable amounts of chemical agents for effecting under controlled conditions, after the fiber has been impregnated with the binder and the whole mat suitably partially consolidated, the crosslinking of the diene copolymer component. These chemical systems for effecting such controllable crosslinking are well known in the rubber art and in the case of the diene hydrocarbon polymers and copolymers, normally function through a disulfide formed crosslink arising from the presence of mercaptans and/or sulfur in the diene polymer composition, and in the case of the negatively substituted diene polymers and copolymers, such as the 2-chlorobutadiene-1,3 (chloroprene) polymers and copolymers, normally function through halogen removal as effected by the presence in the diene polymer composition of appreciable quantities of metallic oxides such as zinc or magnesium oxides.

In many instances it is desirable to have present in the binder composition appreciable proportions of plasticizers for the binder polymers. This is particularly important in the case of the vinylidene resins, particularly the higher molecular weight, negatively substituted vinylidene polymers and copolymers, such as the vinyl chloride/vinylidene chloride, vinyl chloride/vinyl acetate copolymers, especially to produce leather-like products of good drape and high pliability. The presence of these plasticizers in the case of such polymers tends to prevent the formation of leather-like products of too great stiffness. Such plasticizers are by now well recognized in the art.

Suitable examples of these include the higher molecular weight mono- or dicarboxylic acid/alcohol or polyesters such as glycerol monooleate, glycerol sebacate, ethylene octanoate, and the like; or the lower molecular weight polyesters and polyethers such as the polyalkylene oxides and their esters, e. g., polyethylene oxide, methoxypolyethyleneglycol; the lower molecular weight condensation polyesters such as polyethyleneglycol adipate and the like.

Example I illustrates the preparation of leather-like sheet material in accordance with this invention and using the controlled partial consolidation step. The preferred leather-like products essentially comprise, by weight, 40% to 85% of matted, undrawn but orientable fibers of a synthetic linear polymer, preferably a condensation polymer, and, distributed therethrough, 60% to 15% of an extensible polymeric binder chemically dissimilar to the polymer used in the fibers, incompatible therewith, and melting below the softening temperature thereof, the matted fibers with the binders distributed therethrough being partially consolidated to give a permeable product having the desired volume of interconnecting void space.

The best leather-like products with respect to the important property of ability to "breathe" are those in which the partial consolidation is carried out to give a volume percent of interconnecting void space distributed therethrough at least equal to 3000 (weight percent fiber)$^{-1}$—30 and not greater than 70% and, more specifically for use in shoe uppers, a volume percent equal to 3000 (weight percent fiber)$^{-1}$—(25±5). For maximum toughness in these leather-like products, fiber/binder ratios of 50/50 to 70/30 are used, with an approximately 50/50 ratio being optimum with most combinations of fiber and binder.

It is frequently desirable in preparing the permeable products to achieve a leather-like construction by preparing products possessing a binder-rich "skin" or "grain" side, and a fiber-rich "flesh" side. This may be achieved by plying mats of suitably varied fiber/binder ratios. It may also be accomplished by controlling the migration of binder during drying of mats impregnated with solutions or dispersions of binder. Thus, a freshly impregnated mat possesses an essentially homogeneous binder distribution, and this can be retained, if desired, by immobilizing the dispersion through heating, cooling, or treatment with a precipitating or coagulating agent. If such immobilization is deferred, the binder tends to migrate toward the outer surfaces of the product as the solvent or vehicle evaporates, and binder immobilization can then be carried out at any desired stage of migration. Subsequent controlled consolidation will result in a product which is binder-rich on both surfaces and fiber-rich in the interior, a construction of value for certain uses. However, if such a product be split at or near the middle, a very leather-like product results, with a binder-rich "grain" and a fiber-rich "flesh" side. Such splitting can be accomplished on conventional leather-splitting machines, or by simple mechanical separation, particularly if a suitable ply-line has been established by plying of two or more mats of structural fiber either before or after the step of impregnating with the binder.

Products thus prepared are particularly susceptible to boarding treatments, whereby a leather-like surface grain is imparted by sharply creasing and rolling the "grain" side.

When the binder component is applied in the form of continuous films to the fiber mat and the composite material then consolidated either wholly or partially by solvent or thermal means, under superatmospheric pressure if desired, the non-permeable products of this invention are thus obtained. To obtain permeable sheet material the binder component must be present in discontinuous or dispersed state in the fiber mat prior to consolidation. In the preferred thermal consolidation step for both the permeable and non-permeable products flat plate or roller presses can be used and these can have a design or pattern cut or embossed therein which is transferred to the product, for instance, a grain, or woven pattern so as to impart, respectively, a leather-like or cloth-like surface to the product.

Color can be imparted to the products by dyeing after finishing, or preferably using pre-dyed or pre-pigmented structural fibers and/or by incorporating dyes or pigments in the binder component. The colored products prepared by the preferred techniques are uniformly colored throughout which is especially advantageous in the case of the permeable, leather-like products which, unlike colored natural leather, do not exhibit any marked or undesirable color changes when scuffed or abraded.

An advantage of the present invention is that it provides sheet material appreciably more pliable and having much greater tear strength, flex life, and elongation, with little, if any, loss in tensile strength as compared with corresponding sheet material using stronger, oriented structural fibers. The non-permeable material having substantially no void space therein, is particularly adapted for use in products where toughness and impermeability is at a premium, such as luggage, women's handbags, tarpaulin substitutes, belting, shoe soles, and the like. The permeable leather-like material, on the other hand, is particularly adapted for use in those products where breathability is critical, e. g., protective clothing such as gloves, jackets, and shoe uppers.

As many apparently widely different embodiments of this invention may be made without departing from the spirit and scope thereof, it is to be understood that the invention is not limited to the specific embodiments thereof except as defined in the appended claims.

The invention claimed is:

1. Sheet material comprising, by weight, 20% to 85% of matted, undrawn but orientable fibers of a synthetic linear polymer and 80% to 15% of an extensible polymeric binder.

2. Sheet material comprising, by weight, 30% to 70% of matted, undrawn but cold-drawable fibers of a synthetic linear polymer and 70% to 30% of an extensible polymeric binder.

3. Sheet material as set forth in claim 2 wherein said fibers are not greater than 1.5 inches in length.

4. Sheet material as set forth in claim 2 wherein said fibers are not greater than 0.5 inch in length.

5. Sheet material essentially comprising, by weight, 20% to 85% of matted, undrawn but cold-drawable fibers of a synthetic linear condensation polymer and, distributed therethrough, 80% to 15% of an extensible polymeric binder chemically dissimilar to said linear condensation polymer, incompatible therewith, and melting below the softening temperature thereof.

6. Sheet material as set forth in claim 5 wherein said fibers are not greater than 1.5 inches in length.

7. Non-permeable sheet material essentially comprising, by weight, 30% to 70% of matted, undrawn but cold-drawable fibers of a synthetic linear polymer and, distributed therethrough, 70% to 30% of an extensible polymeric binder chemically dissimilar to said linear condensation polymer, incompatible therewith, and melting below the softening temperature thereof.

8. Non-permeable sheet material as set forth in claim 7 wherein said fibers are not greater than 1.5 inches in length.

9. A leather-like product essentially comprising, by weight, 40% to 85% of matted, undrawn but orientable fibers of a synthetic linear condensation polymer and, distributed therethrough, 60% to 15% of a polymeric binder chemically dissimilar to said linear condensation polymer, incompatible therewith, and melting below the softening temperature thereof, said product containing a volume percent of interconnecting void space distributed therethrough at least equal to 3000 (weight percent fiber)$^{-1}$—30 and not greater than 70%.

10. Sheet material comprising, by weight, 20% to 85% of matted, undrawn but cold-drawable fibers of a synthetic linear condensation polymer from the group consisting of polyamides, polyesters, and polyester-amides in the molecular structure of which there are solely hydrocarbon groups between the functional groups and, distributed therethrough, 80% to 15% of an extensible polymeric binder in which the polymeric component is a vinylidene polymer, said polymeric binder being incompatible with said linear condensation polymer and melting at least 10° C. below the softening temperature thereof.

References Cited in the file of this patent

UNITED STATES PATENTS

| | | |
|---|---|---|
| 2,336,797 | Maxwell | Dec. 14, 1943 |
| 2,482,062 | Hanson | Sept. 13, 1949 |
| 2,530,441 | Reinhardt et al. | Nov. 21, 1950 |
| 2,543,101 | Francis | Feb. 27, 1951 |
| 2,626,214 | Osborne | Jan. 20, 1953 |